Oct. 4, 1927.

B. NOBLE 1,644,265

SAFETY VALVE

Filed Sept. 10, 1923  2 Sheets-Sheet 1

Inventor
Benjamin Noble
By Barchef & Barchef
Attorneys

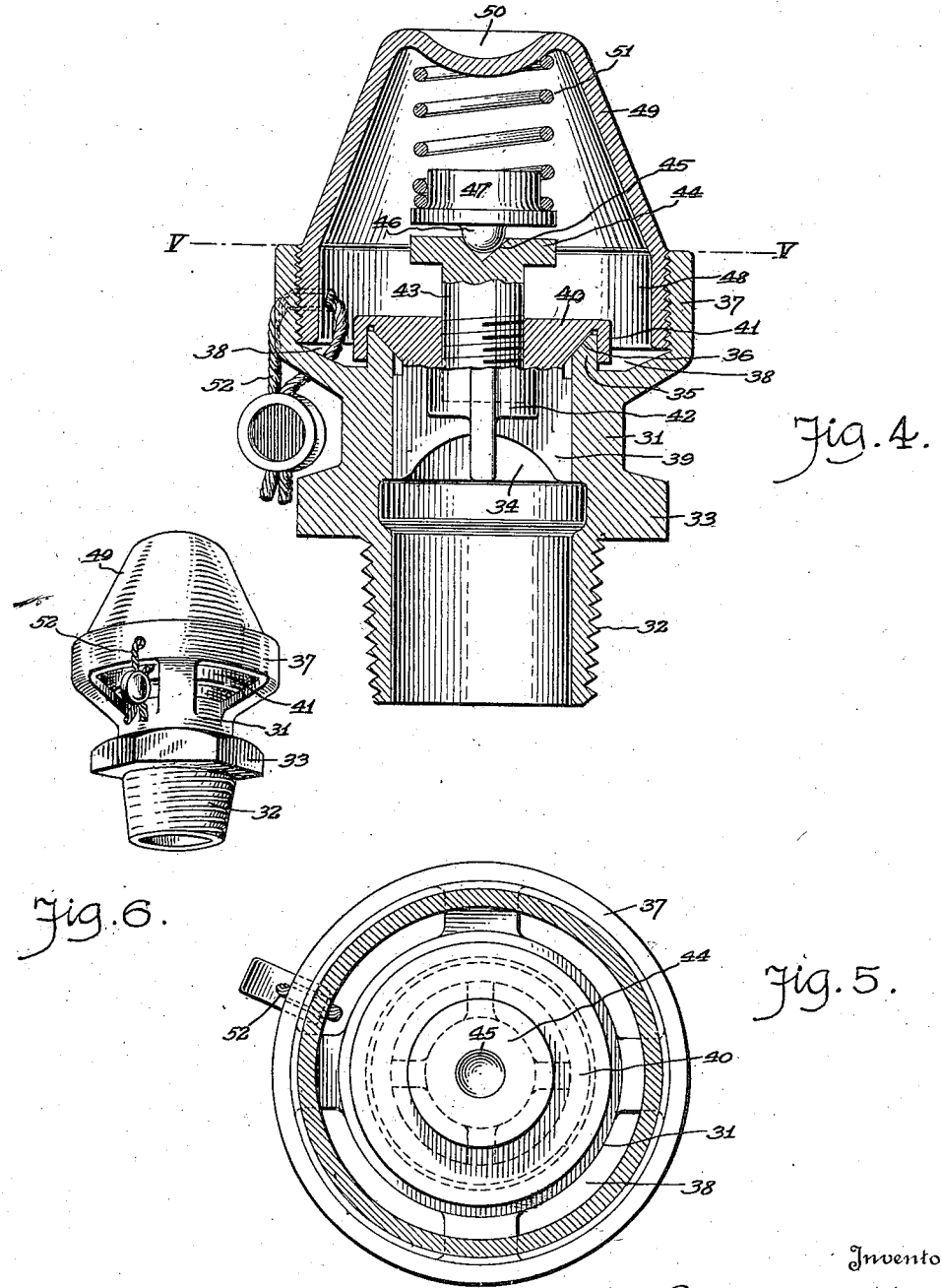

Patented Oct. 4, 1927.

1,644,265

UNITED STATES PATENT OFFICE.

BENJAMIN NOBLE, OF DETROIT, MICHIGAN, ASSIGNOR, BY MESNE ASSIGNMENTS, TO MICHIGAN SMELTING & REFINING COMPANY, OF DETROIT, MICHIGAN, A CORPORATION OF MICHIGAN.

SAFETY VALVE.

Application filed September 10, 1923. Serial No. 661,938.

This invention relates to safety valves and has special reference to that class of valves wherein spring pressure holds the valves normally closed but permits of the valves opening when a counteracting pressure overcomes that of the valve springs.

The primary object of my invention is to provide a safety valve of the above type wherein a dome or cap incloses the valve spring and permits of the tension of the spring being regulated according to the pressure to be controlled by the valve. The cap or dome provides centering means for the spring and means by which the cap or dome may be sealed or fixed so that it cannot be conveniently tampered with and adjusted to change the action of the valve.

Another object of this invention is to provide a safety valve of the above type with a manually operated release member by which the valve may be actuated and the manner of supporting the release member is such that it is at all times in an active position irrespective of any adjustment of the cap or dome of the valve.

A further object of this invention is to provide a compact and durable safety valve which affords a positive closure for a steam, air, liquid or fluid line wherein the liquid or fluid is under pressure and adapted to be relieved when the pressure becomes excessive.

Still further objects of my invention are to furnish a valve body with a liner or bushing, and to provide means for equalizing the action between a valve and a spring holding the valve normally seated.

The above are a few of the objects attained by the construction to be hereinafter described and then claimed, and reference will now be had to the drawings, wherein Figure 1 is a vertical sectional view of the preferred form of safety valve;

Fig. 4 is a vertical sectional view of another form of safety valve;

Fig. 5 is a horizontal sectional view of the same taken on the line V—V of Fig. 4, and Fig. 6 is a perspective view of the safety valve shown in Figs. 4 and 5.

Figure 1:
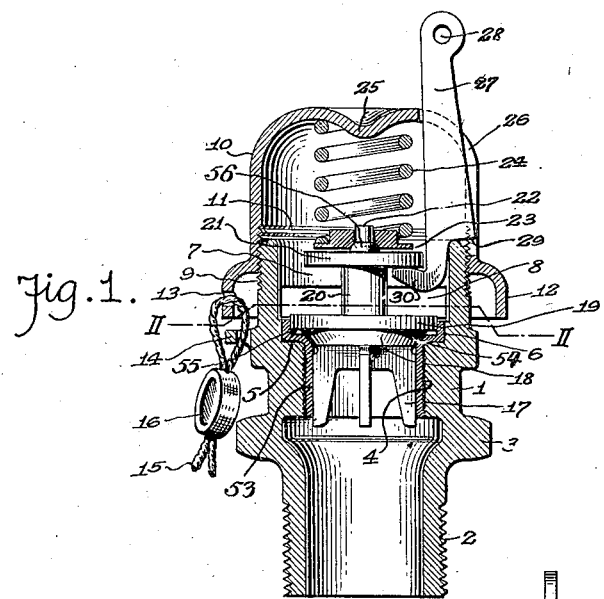
Figure 2:
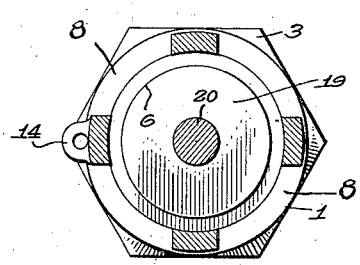
Fig. 2 is a horizontal sectional view taken on the line II—II of Fig. 1.
Figure 3:
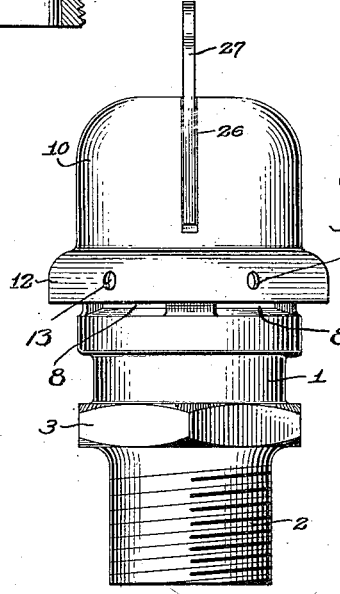
Fig. 3 is a side elevation of the safety valve.

Considering Figs. 1, 2 and 3, the safety valve comprises a valve body 1 having an inner exteriorly screwthreaded connection 2 and a nut portion 3 which facilitates placing the connection 2 in engagement with a pipe line containing a liquid or fluid under pressure.

The central portion of the valve body 1 has a bore 4 with its outer end terminating in a seat 5 and a recess 6, said recess communicating with an exhaust chamber 7 in the outer end of the valve body. The chamber walls are provided with a plurality of exhaust openings 8 and the outer end of said valve body is exteriorly screwthreaded, as at 9, while the walls of the bore 4 are screwthreaded to receive a liner or bushing 53 which engages the seat 5 and recess 6 of the valve body. Since the valve body is ordinarily made of iron, the liner or bushing may be of brass, but it is obvious any material may enter into the manufacture of the valve.

Screwed on the outer end of the valve body 1 and adapted to be adjusted thereon is a bell shaped cap or dome 10 having its inner wall provided with a screwthreaded portion 11 so that it may be screwed on the outer end of the valve body. The inner open end of the cap 10 terminates in a skirt 12 which surrounds the outer end of the valve body 1, particularly at the exhaust openings 8, so that when fluid under pressure escapes from the chamber 7 the fluid will be directed downwardly at the sides of the valve body. The skirt 12 has one or more apertures 13 and one of said apertures may be placed in proximity to an apertured ear 14 on the side of the valve body 1, so that a wire 15 or other flexible member may extend through the ear 14 and the skirt 12 and have its ends connected by a seal 16, which together with the wire 14 represent a conventional form of fastening device that will prevent the cap or dome 10 from being surreptitiously adjusted.

Slidable in the liner 53 are the guide wings 17 of a valve 18 normally engaging a valve seat 54 of the liner, said valve having a guide collar 19 slidable in a recess 55 of the liner. In addition to the guide collar 19 the valve has an axial stem 20 extending into the exhaust chamber 7 and provided with a head 21 and a fulcrum pin 22. Seated on the fulcrum portion 56 of the pin 22 is a spring seat or retaining member 23 for a coiled expansion spring 24 which is centered within the cap or dome 10 by the outer end convolution of said spring surrounding an indentation 25 of the cap or dome, said indentation providing an inwardly projecting teat or lug which cooperates with the spring retaining member 23 in holding the expansion spring 24 axially of the valve. The fulcrum between the valve stem and spring equalizes any inequalities between the stem and spring during operation of the valve.

One side of the cap or dome 10 has a longitudinal slot 26 and loosely mounted in said slot is a release member or lever 27 adapted to be manually actuated, the outer end of said member or lever being apertured, as at 28, so that a flexible member may be conveniently attached thereto to facilitate actuation of the lever or member 27.

The inner end of the member or lever 27 has a shoulder 29 loosely fulcrumed on the edge of the wall forming the exhaust chamber 7, such wall representing the outer end of the valve body 1. Adjacent the shoulder 29 is a hook shaped member 30 extending into the exhaust chamber 7 and under the head 21, so that when the outer end of the lever or member 27 is pulled outwardly or away from the axis of the valve, said lever or member fulcrums on the valve body and lifts the head 21 and the valve 18. Since the lever or member 27 is loosely fulcrumed on the end of the valve body it may be carried or shifted about by the cap or dome 10 during adjustment of said cap or dome, and the manner of mounting the lever or member permits of it at all times being in an active position for a manual actuation of the valve 18, yet not interfering with opening of the valve 18 by excessive pressure in the bore 4.

Reference will now be had to Figs. 4, 5 and 6 showing another form of valve body 31 having an exteriorly screwthreaded connection 32, a nut portion 33, a bore 34, a guide flange 35, a valve seat 36, and an interiorly screwthreaded skirt 37 provided with exhaust openings 38.

Slidable in the bore 34 are the guide wings 39 of a valve 40 normally engaging the seat 38, said valve having an annular flange 41 slidable on the guide flange 35. Centrally of the valve 40 is a socket 42 in which is screwed a stem 43 having a head 44 provided with an axial recess 45 for the teat or rocker 46 of a spring retaining member 47.

Screwed into the skirt 37 is the inner cylindrical end 48 of a frustro-conical shaped cap or dome 49 having an axial indentation 50 affording centering means for the outer convolution of a spring 51 which has its inner convolution on the retaining member 47. The expansive force of the spring 51 holds the valve 40 normally seated against a predetermined pressure of fluid in the bore 34, but permits of said valve opening because of excessive pressure.

A suitable fastening device 52 may connect the inner end 48 of the cap or dome 49 to the skirt 37.

In this form of valve the stem 43 may be adjusted to increase or decrease the tension of the spring 51 and the retaining member 47 will cooperate with the indentation 50 of the cap or dome in maintaining the spring 51 axially of the valve.

While in the drawings there are illustrated the preferred embodiments of my invention, it is to be understood that the structural elements are susceptible to such variations and modifications as fall within the scope of the appended claims.

What I claim is:—

1. In a safety valve body, a spring-pressed normally closed valve, an adjustable cap for said valve body and by which cap the action of said valve may be regulated, and a member fulcrumed on said valve body and movable by said cap circumferentially of said valve body, said member adapted for manual actuation to unseat valve.

2. A valve structure comprising a valve body, an adjustable cap on said valve body, a valve in said valve body, a coiled spring holding said valve normally seated, said cap having a central depressed portion extending into the upper convolution of said spring for centering one end of said spring in said cap, means on said valve centering the opposite end of said spring, and means loosely fulcrumed on said valve body and extending through said cap adapted for manually unseating said valve.

3. A valve structure comprising a valve body, an adjustable cap on said valve body, a valve in said valve body, a coiled spring holding said valve normally seated, said cap having a central depressed portion extending into the upper convolution of said spring for centering the upper end of said spring in said cap, said spring having an unobstructed central portion, and a rockable member supported from said valve and centering the lower convolution of said spring relative to said valve.

4. A valve structure comprising a valve body, an adjustable cap on said valve body, a valve in said valve body, a spring holding said valve normally seated, said cap having a central depressed portion extending into the upper convolution of said spring for centering one end of said spring in said cap, means on said valve centering the opposite end of said spring, and means loosely fulcrumed on said valve body and extending through said cap adapted for manually unseating said valve.

In testimony whereof I affix my signature.

BENJAMIN NOBLE.